(12) United States Patent
Nagy et al.

(10) Patent No.: US 11,917,023 B2
(45) Date of Patent: Feb. 27, 2024

(54) FAST SESSION RESTORATION FOR LATENCY SENSITIVE MIDDLEBOXES

(71) Applicant: Telefonaktiebolaget LM Ericsson (publ), Stockholm (SE)

(72) Inventors: Mate Imre Nagy, Budapest (HU); Dietmar Fiedler, Kirkkonummi (FI); Péter Mátray, Budapest (HU); Dániel Géhberger, Montréal (CA); Gábor Németh, Budapest (HU); Balázs Pinczel, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 188 days.

(21) Appl. No.: 17/293,984

(22) PCT Filed: Nov. 21, 2019

(86) PCT No.: PCT/IB2019/060031
§ 371 (c)(1),
(2) Date: May 14, 2021

(87) PCT Pub. No.: WO2020/104988
PCT Pub. Date: May 28, 2020

(65) Prior Publication Data
US 2022/0124159 A1   Apr. 21, 2022

Related U.S. Application Data

(60) Provisional application No. 62/779,313, filed on Dec. 13, 2018, provisional application No. 62/770,550, filed on Nov. 21, 2018.

(51) Int. Cl.
*H04L 67/148* (2022.01)
*H04L 41/0654* (2022.01)
(Continued)

(52) U.S. Cl.
CPC ........ *H04L 67/148* (2013.01); *H04L 41/0654* (2013.01); *H04L 67/1095* (2013.01);
(Continued)

(58) Field of Classification Search
CPC ............. H04L 61/0654; H04L 67/1095; H04L 67/1097; H04L 67/142; H04L 67/145; H04L 67/146; H04L 67/148
See application file for complete search history.

(56) References Cited

U.S. PATENT DOCUMENTS 7,444,335 B1   10/2008   Colrain et al.
7,483,374 B2   1/2009   Nilakantan et al.
(Continued)

FOREIGN PATENT DOCUMENTS

CN   102938705 A   2/2013
CN   107454155 A   12/2017
(Continued)

OTHER PUBLICATIONS

Varia, J., "Cloud Architectures", Amazon Web Services, Jul. 15, 2018, pp. 1-14.
(Continued)

*Primary Examiner* — Gil H. Lee
(74) *Attorney, Agent, or Firm* — COATS & BENNETT, PLLC

(57) ABSTRACT

Methods and apparatus for fast session restoration of user sessions in a network node are suitable for latency sensitive applications. The fast session restoration techniques take advantage of the layered architecture of a network node and stores layer-specific descriptors that describe the states of corresponding service layers of a network node for an active session. When a failure of the network nodes occurs, the descriptors are used to achieve a seamless and fast session restoration.

18 Claims, 11 Drawing Sheets

(51) Int. Cl.
*H04L 67/1095* (2022.01)
*H04L 67/1097* (2022.01)
*H04L 67/142* (2022.01)
*H04L 67/146* (2022.01)
*H04L 67/145* (2022.01)

(52) U.S. Cl.
CPC ........ *H04L 67/1097* (2013.01); *H04L 67/142* (2013.01); *H04L 67/145* (2013.01); *H04L 67/146* (2013.01)

(56) References Cited

U.S. PATENT DOCUMENTS

| | | | |
|---|---|---|---|
| 7,716,274 | B1 | 5/2010 | Kumar |
| 7,971,099 | B2 | 6/2011 | Coffey et al. |
| 8,918,673 | B1 | 12/2014 | Rangaiah et al. |
| 9,727,486 | B1 * | 8/2017 | Yochai ............... G06F 12/0804 |
| 2004/0107382 | A1 | 6/2004 | Doverspike et al. |
| 2005/0172161 | A1 | 8/2005 | Cruz et al. |
| 2006/0153064 | A1 | 7/2006 | Caballero-McCann et al. |
| 2006/0294241 | A1 | 12/2006 | Cherian et al. |
| 2007/0153676 | A1 | 7/2007 | Baglin et al. |
| 2007/0245167 | A1 | 10/2007 | De La Cruz et al. |
| 2008/0040484 | A1 | 2/2008 | Yardley |
| 2009/0254775 | A1 | 10/2009 | Coffey et al. |
| 2012/0236823 | A1 | 9/2012 | Kompella et al. |
| 2013/0107872 | A1 | 5/2013 | Lovett et al. |
| 2014/0229606 | A1 | 8/2014 | Griswold et al. |
| 2014/0301388 | A1 | 10/2014 | Jagadish et al. |
| 2014/0344441 | A1 | 11/2014 | Janakiraman et al. |
| 2016/0344821 | A1 * | 11/2016 | Khosrowpour ..... H04L 67/1029 |
| 2019/0012357 | A1 * | 1/2019 | Schreter ............. G06F 12/1009 |
| 2019/0052520 | A1 | 2/2019 | Luo |

FOREIGN PATENT DOCUMENTS

| | | |
|---|---|---|
| EP | 2806678 A1 | 11/2014 |
| WO | 2017207049 A1 | 12/2017 |
| WO | 2019114970 A1 | 6/2019 |
| WO | 2020104992 A1 | 5/2020 |

OTHER PUBLICATIONS

Németh, G. et al., "DAL: A Locality-Optimizing Distributed Shared Memory System", Proceedings of the 9th USENIX Conference on Hot Topics in Cloud Computing, Jul. 2017, pp. 1-6.

Netgear Support, "What are VRRP N:1 Redundancy Concepts for my ProSAFE Wireless Controller WC7600", Dec. 6, 2018; pp. 1-5.

Yu, Y. et al., "NetCP: Consistent, Non-interruptive and Efficient Checkpointing and Rollback of SDN", IEEE/ACM 26th International Symposium on Quality of Service (IWQoS), Jun. 4-6, 2018, pp. 1-10.

Nadas, S., "Virtual Router Redundancy Protocol (VRRP) Version 3 for IPV4 and IPV6", Internet Engineering Task Force (IETF); Request for Comments: 5798; Obsoletes: 3768; Category: Standards Track, Mar. 2010, pp. 1-40.

Németh, G. et al., "DAL: A Locality-Optimizing Distributed Shared Memory System", pp. 1-2, retrieved on Oct. 16, 2018, retrieved from internet https://www.usenix.org/conference/hotcloud17/program/presentation/nemeth.

Zhang, H. et al., "Research on Back-up Plan of MMSG based on IP Addressing", ZTE Communications, vol. 13, No. 3, Jun. 2007, China Academic Journal Electronic Publishing House.—Abstract Only Translation.

* cited by examiner

FAST SESSION RESTORATION FOR LATENCY SENSITIVE MIDDLEBOXES

RELATED APPLICATIONS

This application claims priority to U.S. Provisional Application No. 62/779,313 filed 13 Dec. 2018 and U.S. Provisional Application No. 62/770,550 filed 21 Nov. 2018. The disclosures of each of these references are incorporated in their entireties by reference herein.

TECHNICAL FIELD

The present disclosure relates generally to failure recovery mechanisms in a communication networks and, more particularly, to fast restoration of user sessions handled by network nodes in the communication network.

BACKGROUND

In traditional mobile telecommunication networks, network functions are implemented mostly on proprietary hardware. Traditional network nodes in the media plane couple the state of the user sessions with the processing components. In case of the failure of a component, the user sessions get lost. Cloud applications, on the other hand, aim to break this coupling in order to make network functions more robust and elastic.

Unfortunately, it is not apparent how to represent the state of a single user session. Because the states are usually distributed throughout the system, the most common redundancy schemes are either local 1+1 redundancy with hot standby (with session retention), or N+1 redundancy with cold standby (no session retention). Naive 1+1 redundancy doubles the required resources, which makes 1+1 redundancy inefficient in cloud implementations.

In a typical network node, a layered approach is used to implement the functionality of the network node. Different functions of the network node are logically grouped into separate layers or planes. As one example, the functions of a network node can be divided into control plane functions and media plane functions. The media plane includes functions that handle content traffic during a media session. The control plane, by contrast, includes functions that control a media session. For example, the control plane functions include establishing, modifying and tearing down media sessions. If a higher-level function fails without having 1+1 protection, it results in complete loss of sessions, as partial session states in the layers below are insufficient to rebuild the complete session.

It is also common in legacy systems that dedicated hardware resources (e.g., board, chip) are allocated to handle a subset of active user sessions. However, this approach does not apply to cloud implementations where a virtual machine (VM) can serve tens of thousands of sessions, relying on a single hardware infrastructure. In such a system, all the sessions get lost if a VM fails, which impacts a large number of subscribers, which cannot be tolerated. Cloud applications typically store their internal states in a common external database that is accessible by all members of the Virtual Network Function (VNF). This setup is often referred as "cloud native", meaning that the lifecycle of a VM or container does not have effect on the service that the VNF provides. Unfortunately, there does not exist a de facto state restoration scheme for latency sensitive cloud applications, such as network nodes in a telecommunication network.

Naive 1+1 redundancy doubles the required resources, which makes 1+1 redundancy inefficient in cloud implementations. A similar problem in cloud implementation is how to return to the last known working state of the network function upon a failure (e.g., due to misconfiguration). This is called rollback recovery, and there are two general approaches: log-based and checkpointing. With log-based recovery, all changes in the state of a session are logged. In case of failure, the logs are replayed until the last consistent state is reached. With checkpointing, the state of the user session is periodically recorded. In case of a failure, the last checkpoint is restored.

For log-based recovery, frequent updates to the database are needed to record the complete chain of events to restore the user session to the last consistent state. Further, when restoring a user session, the time to fetch and replay the full sequence of elementary events is typically too long for latency sensitive systems (such as media streams). Recovery from elementary events can easily lead to media outages of tens of seconds, which is not acceptable for end users.

In case of checkpointing where sessions are distributed, there are numerous data structures to periodically snapshot. The system must recognize if a state is complete and needs checkpointing. Also, consistency between the checkpoints of different components needs to be ensured. These challenges add significant complexity to the system. Moreover, measures need to be taken to make sure that the checkpointing itself does negatively impact the performance of the actual traffic handling.

SUMMARY

The present disclosure comprises methods and apparatus for fast session restoration for network nodes that is suitable for latency sensitive applications. The fast session restoration techniques take advantage of the layered architecture of a network node and stores layer-specific descriptors that describe the states of corresponding service layers of a network node for an active session. When a failure of the network nodes occurs, the descriptors are used to achieve a seamless and fast session restoration.

A first aspect of the disclosure comprises methods implemented by a redundancy controller of providing protection for a session managed by a network node, where the network node is implemented by a hierarchy of service layers. In one embodiment, the redundancy controller generates, for at least one service layer of the network node, a descriptor representing a state of the service layer for an active session. The redundancy controller further stores the descriptor for the service layer in an external database for use in failure recovery.

A second aspect of the disclosure comprises a redundancy controller providing protection against the failure of a network node, where the network node is implemented by a hierarchy of service layers. The redundancy controller comprises a processing circuit configured to generate, for at least one service layer of the network node, a descriptor representing a state of the service layer for an active session. The processing circuit is further configured to store the descriptor for the service layer in an external database.

A third aspect of the disclosure comprises a computer program comprising executable instructions that, when executed by a processing circuit in a redundancy controller in a network node, causes the redundancy controller to perform the method according to the first aspect.

A fourth aspect of the disclosure comprises a carrier containing a computer program according to the third aspect, wherein the carrier is one of an electronic signal, optical signal, radio signal, or non-transitory computer readable storage medium.

BRIEF DESCRIPTION OF THE DRAWINGS

FIG. 8A shows an implementation where the logical elements are co-located in the same physical hardware. FIGS. 8B and 8C show implementations where the redundancy controller is located in separate physical hardware. FIG. 8D shows an implementation where the functionality of the redundancy controller is distributed in different physical hardware.

DETAILED DESCRIPTION

Figure 1:
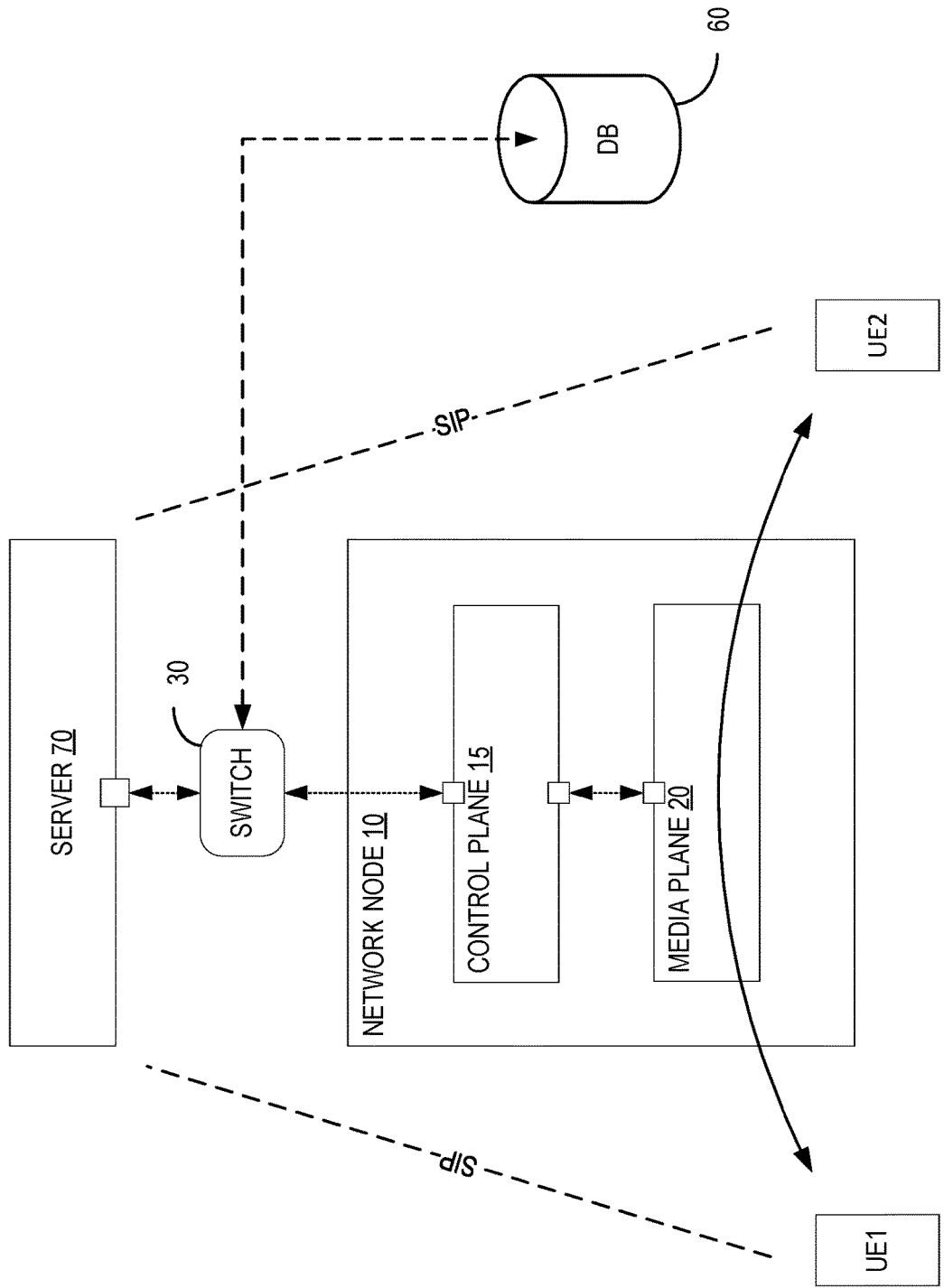
FIG. 1 illustrates the logical elements of a network node in the path of media traffic.

Referring now to the drawings, an exemplary embodiment of the disclosure will be described in the context of a network node 10 in a communication network for handling media traffic. The network node 10 can also comprise a core network node in a packet core network, such as an Evolved Packet Core (EPC) or Fifth Generation (5G) Core (5GC) network. The network node 10 may also comprises a network node in an Internet Protocol (IP) Multimedia Subsystem (IMS) network. As a specific example, the network node 10 may comprise a media gateway, such as a Border Gateway Function (BGF), or Media Resource Function Processor (MRFP). Those skilled in the art will appreciate that the methods and apparatus herein described are not limited to the examples given herein, but may also be used in other types of network node handling media traffic of user traffic.

FIG. 1 illustrates a network node 10 in the media path between a first user equipment (UE1) and a second user equipment (UE2). The functionality of the network node 10 is separated into layers. In the exemplary embodiment shown, the functionality of the network node 10 is divided into a control plane player 15 and a media plane layer 20 also referred to herein as a data plane layer. The control plane layer 15 in this example communicates with a server 70, such as a media gateway controller, using the H.248 protocol or other media gateway protocol. The control plane layer 15 is the terminating point for the H.248 signaling, which is used to set-up, modify and terminate media sessions. The media plane layer 20 handles the flow of user traffic through the network node 10 between UE1 and UE2 (e.g., installing traffic flows and routing user traffic).

Those skilled in the art will appreciate that the functions represented by the control plane layer 15 and media plane layer 20 can be implemented in the same physical processing resources (e.g., host computers or servers) or in different physical resources. Also, the functions of the control plane layer 15 and/or media plane layer 20 can be implemented in a distributed fashion. That is, the functions of the control plane layer 15 can be distributed across multiple host computers or other physical processing resources. Similarly the functions of the control plane layer 15 can be distributed across multiple host computers other physical processing resources. In some implementations, the functions of the control plane layer 15 and/or media plane layer 20 can be implemented by two or more virtual machines (VMs) running on different host computers or other physical processing resources.

A switch 30 is disposed in the signaling path between the control plane layer 15 and the external server 70. Switch 30 connects to an external database 60 that logs the messages transmitted between the control plane layer 15 and the external server 70. In this way, if the network node 10 fails, the sessions handled by the network node 10 can be restored by playing back the stored messages. Alternatively, the state of the network node 10 can be periodically recorded to create a snapshot or checkpoint that can be used for session restoration in the event that the network node 10 fails.

Log-based recording and checkpointing are commonly used techniques for session restoration following a failure of a network node 10. With log-based recording, the external database 60 needs to be frequently updated to record the chain of events affecting the state. Also, the time needed to fetch and play back the stored messages to recreate the session can be too long for latency sensitive applications. Checkpointing adds significant complexity and can impact performance of traffic handling.

One aspect of the present disclosure comprises methods of fast session restoration for network nodes 10 that is suitable for latency sensitive applications, such as latency sensitive middle boxes (e.g., network node 10). The fast session restoration techniques described herein take advantage of the layered architecture of a network node 10 and stores layer-specific descriptors that describe the states of corresponding service layers of a network node 10 for an active session. The descriptors can be viewed as a composite of the incoming messages that were received to build up the state. Thus, in some embodiments, it is possible to represent the state of a service layer with a single message or descriptor. When a failure of the network nodes 10 occurs, the descriptors are used to achieve a seamless and fast session restoration as described more fully below.

Figure 2A:
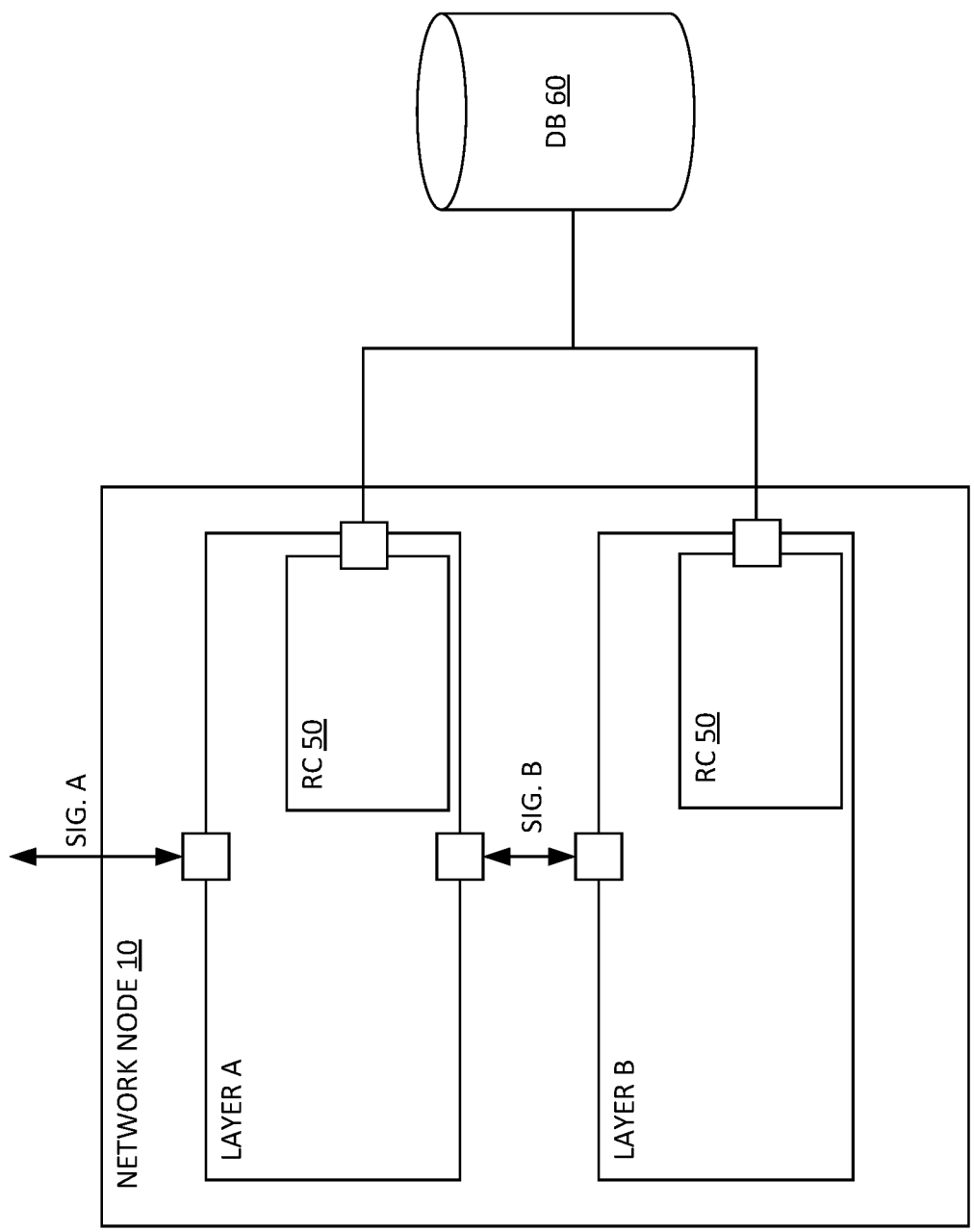
FIGS. 2A and 2B illustrate logical elements of a network node including a redundancy controller.
Figure 2B:
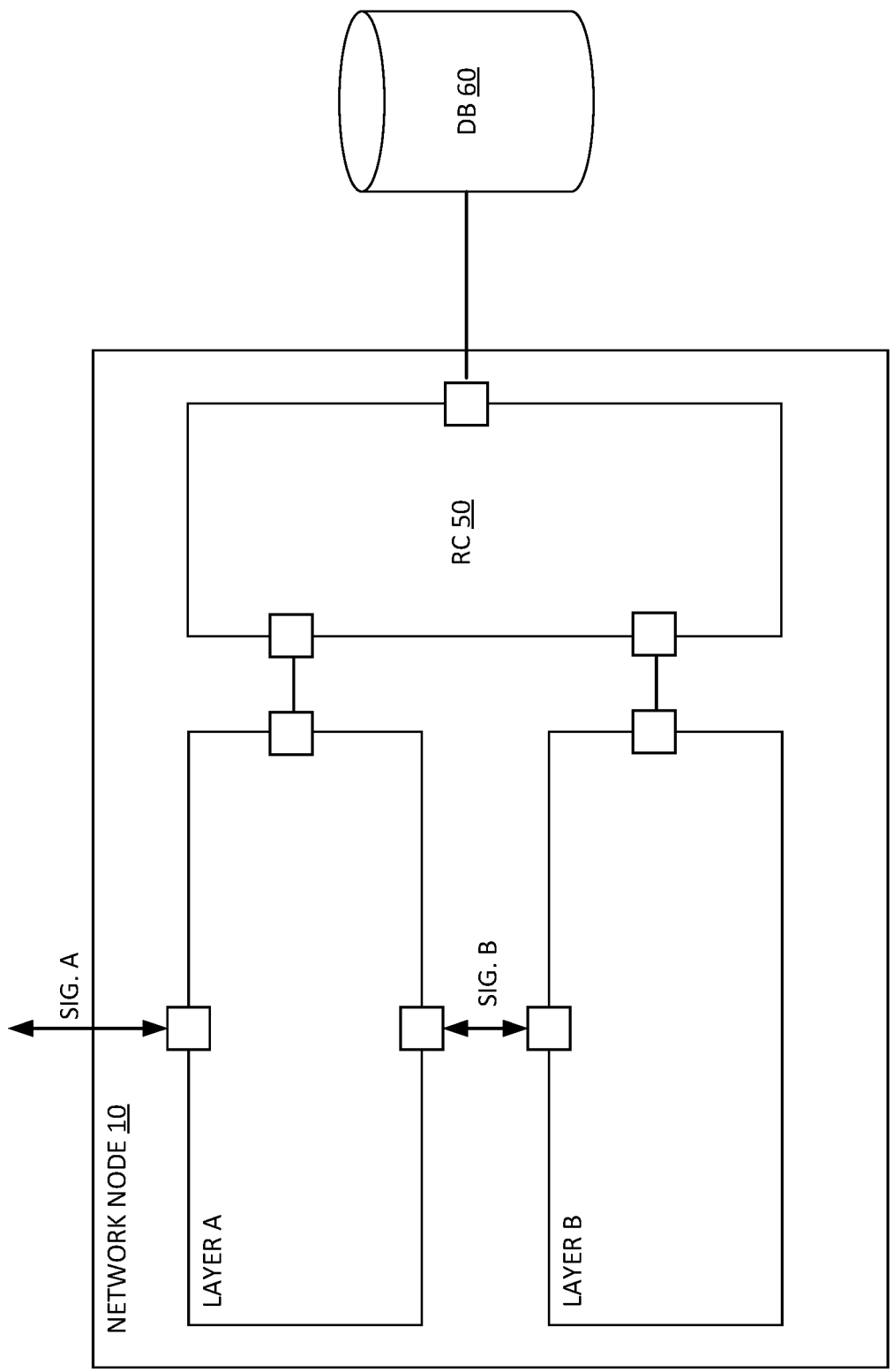

FIGS. 2A and 2B illustrate two implementations of a network node 10 configured to employ the fast session restoration techniques as herein described. As used herein, the term network node 10 refers to a functional entity of the communication network. The network node 10 can be implemented as an application running on physical hardware (e.g., host computer) or as a virtual network function (VNF). In these examples, Layer A represents a service layer (e.g., control plane layer 15) of the network node 10 that implements the control plane functionalities of the network node 10 and exchanges messages with an external server 70 according to a media gateway control protocol, such as H.248. Layer B represents the service layer (e.g., media plane layer 20) of the network node 10 responsible for handling the media plane functions and exchanges messages with Layer A via inter-process signaling. The message exchanges between Layer A and the external server 70, and between Layer A and Layer B, builds up the states of user sessions.

The network node 10 further comprises a redundancy controller (RC) 50 configured to record the state of user sessions handled by the network node 10. Generally, when a session is updated, the RC 50 pushes the new session to an external database 60 that stores the sessions. The RC 50 can be part of Layers A and B (e.g., linked library) as shown in FIG. 2A, or can run separately as shown in FIG. 2B. The database 60 is external (failure disjoint) and provides fast access to session states. Because the session states are created or changed frequently, traditional persistent database functionalities are not required. Thus, the external database 60 can comprise a fast, lightweight in-memory database 60.

One aim of the present disclosure is to provide protection against the loss of user session states. The following failure scenarios in the system are considered:

F1: Restart or termination of a layer (e.g., process restart or crash)
F2: Restart or termination of a network node 10
F3: Restart or termination of the database 60

One aspect of the disclosure comprises recording and storing the states of user sessions to provide failure protection. Another aspect of the disclosure comprises fast restoration of the user sessions after the failure of a network node 10 or component thereof. These aspects are described in more detail below.

State Recording

Figure 3:
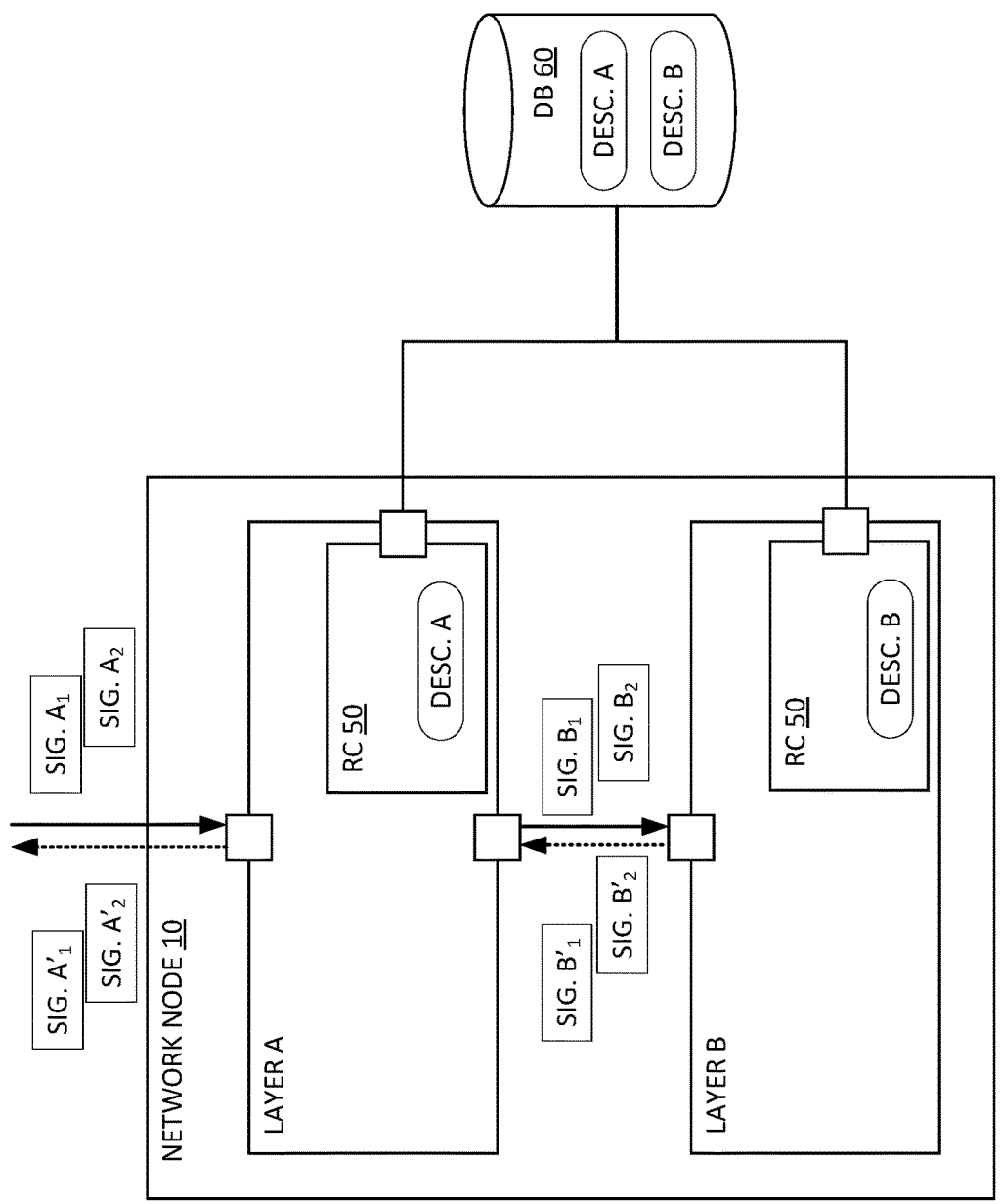
FIG. 3 illustrates in simplified form a two-step a request-reply handshake sequence between a network node and a server for establishing a user session.

One function of the RC 50 is to keep track of the states of the active user sessions in order to be able to rebuild them in case of a failure. In each layer, the reception of a message, or series of messages, results in a state or configuration change that enables some services to the end-users. FIG. 3 illustrates in simplified form a request-replay handshake sequence between a network node 10 and server 70 that is used to create the proper states (e.g., reserving some resources, installing flow rules, opening TCP/IP ports) of a single user session. Layer A receives signal $A_1$ and $A_2$ from the external server 70, and sends signals $B_1$ and $B_2$ to Layer B. Layer A receives corresponding replies $B'_1$ and $B'_2$ from Layer B and sends replies $A'_1$ and $A'_2$ to the external server 70.

Figures 4A, 4B:
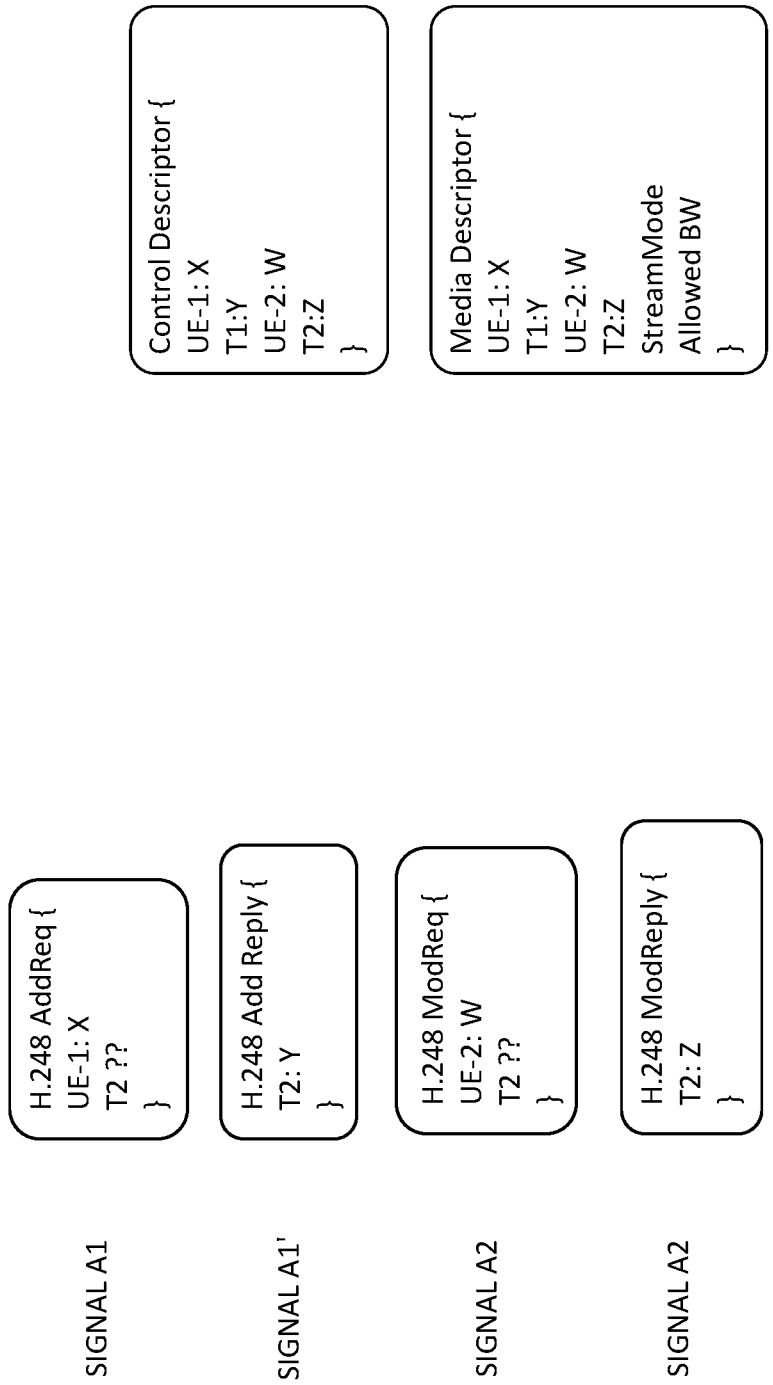
FIG. 4A illustrates exemplary messages in a request-replay handshake sequence between the network node and a server for establishing a session.
FIG. 4B illustrates exemplary descriptors for the control pane and media plane layers in a network node.

FIG. 4A illustrates exemplary signals $A_1$, $A_2$, $A'_1$ and $A'_2$ exchanged in the handshake sequence. The signals $B_1$, $B_2$, $B'_1$ and $B'_2$ exchanged between Layer A and Layer B are not shown. The state is considered to be complete, when everything is in place for the corresponding user to start to use the requested service. The network node 10 is aware if the user state is complete (e.g., obtain it from confirm or reject messages, notification about the start of user traffic, etc.). At this point, the RC 50 saves the state information into an external database 60 making it possible to re-build the state of the user session at any time in the future. Applying the same process to all the user sessions of the network node 10, it is possible to restore all user sessions of any given network node 10 in a cluster.

The states of a user session are stored in database 60 as one or more descriptors that can be used to construct the minimum set of messages, that when replayed to a certain layer, builds up the same states as were originally created. A separate descriptor is created for each layer. Whenever a confirmation message leaves a layer, the relevant information is extracted from the request and confirm messages, and is recorded in a local data structure called a descriptor. When the user session is considered to be complete, the RC 50 pushes the descriptors to the external database 60. The size of the descriptors can be predefined (static) or dynamic. FIG. 4B illustrates in simplified form one example of the descriptors for the handshake example given above.

As shown in FIG. 3, the RCs 50 generate descriptors and communicate with the database 60 to update the descriptors stored in the database. The state of Layer A is stored in a descriptor denoted DescA. The state of Layer B is stored in a descriptor denoted DescB. The descriptors are created when the final confirm message is sent to the server 70.

Two possible approaches are envisioned for maintaining the descriptors in the database. In a first approach, copies of the descriptor are stored locally. When the state of a user session is updated, the local copy is pushed to the external database 60 and overwrites the record copy of the descriptor in the database 60. This approach enables faster database operations. In the second approach, the descriptors are stored externally. In case of an update, the record copy of the descriptor is fetched from the external database 60, modified, and pushed back to the database 60. This approach reduces the memory requirements for the layers.

For time sensitive applications, there is no time to replay the complete history of messages to recreate the state of a user session as is done in log-based rollback recovery. Therefore, several optimizations are made to the state recording to facilitate fast session restoration. These optimizations take advantage of the layered architecture of the network node 10. For each layer, a descriptor is defined that includes only the relevant data for session restoration (e.g., IP addresses, ports, codec list, . . . etc.). Each layer keeps a local copy of the descriptor, and in case of updates, changes to the state of the user session are merged into the local copy of the descriptor. When all the fields of the descriptor are complete, the state is considered to be complete and the local copy of the descriptor is pushed to the external database 60. This approach minimizes the amount of data that needs to be stored in the database. Additionally, recovery time is reduced significantly by preparing compact descriptors.

Example A below illustrates an example request/response message flow and corresponding control plane descriptor representing the state of the control plane layer.

Example A

```
ADD REQ
!/3 [10.52.62.84]:2944
T=34081112{C=${PR=5,A=ip/252/$/${M{ST=1{O{MO=IN,RV=ON,eri_seco/l3tol2percent=130,eri_transco/localSdpQ
uery=ON,eri_transco/sdpOfferAnswer=Offer,ipdc/realm="Core1",ds/dscp=1D,gm/rsb=on,tman/pol=on,tman/sdr=
0,tman/mbs=512,gm/saf=on,gm/spf=on},L{
v=0
c=IN IP4 $
m=audio $ RTP/AVP $
b=AS:134
```

```
a=ptime:$
a=maxptime:$
},R{
v=0
c=IN IP4 10.52.62.135
m=audio 9280 RTP/AVP 104 102 105 100 18 8 0
b=AS:134
a=rtpmap:104 AMR-WB/16000
a=fmtp:104 max-red=0; mode-change-capability=2; mode-set=0,1,2
a=rtpmap:102 AMR/8000
a=fmtp:102 max-red=0; mode-change-capability=2
a=rtpmap:105 telephone-event/16000
a=fmtp:105 0-15
a=rtpmap:100 telephone-event/8000
a=fmtp:100 0-15
a=maxptime:40
a=ptime:20
a=rtpmap:18 G729/8000
a=fmtp:18 annexb=yes
a=rtpmap:8 PCMA/8000
a=rtpmap:0 PCMU/8000
}}},E=1{g/cause,hangterm/thb{timerx=3600}}},A=ip/252/$/${M{ST=1{O{MO=IN,RV=ON,eri_seco/l3tol2percent=130
,eri_transco,ipdc/localSdpQuery=ON,eri_transco/sdpOfferAnswer=Answer,ipdc/realm="Access1",ds/dscp=1D,gm/rsb=o
n,tman/pol=on,tman/sdr=16800,tman/mbs=16800},L{
v=0
c=IN IP4 $
m=audio $ RTP/AVP -
b=AS:134
}}},E=1{g/cause,hangterm/thb{timerx=3605}}}}", level ="DEBUG_HIGH", thread ="CallHandling_0", file =
"BgfH248Handler.cc", line = 120, function ="traceH248Message"}
     ADD REPLY
!/3 mg1/1 @10.52.62.213 P=34081112{C=3001900{A=ip/252/1/3799{M{ST=1{L{
v=0
c=IN IP4 10.52.62.132
m=audio 12224 RTP/AVP 104 102 18 8 0 105 100
b=AS:134
a=rtpmap:104 AMR-WB/16000
a=fmtp:104 max-red=0; mode-change-capability=2; mode-set=0,1,2
a=rtpmap:102 AMR/8000
a=fmtp:102 max-red=0; mode-change-capability=2
a=rtpmap:18 G729/8000
a=fmtp:18 annexb=yes
a=rtpmap:8 PCMA/8000
a=rtpmap:0 PCMU/8000
a=rtpmap:105 telephone-event/16000
a=fmtp:105 0-15
a=rtpmap:100 telephone-event/8000
a=fmtp:100 0-15
a=ptime:20
a=maxptime:40
}}}},A=ip/252/1/3800{M{ST=1{L{
v=0
c=IN IP4 10.52.62.148
m=audio 9536 RTP/AVP -
b=AS:134
}}}}}}", level ="DEBUG_HIGH", thread ="CallHandling_0", file ="BgfH248Handler.cc", line = 398, function =
"sendH248Message"}
     MOD REQ 1
!/3 [10.52.62.84]:2944
T=34081113{C=3001900{PR=9,MF=ip/252/1/3799{M{ST=1{O{MO=IN,RV=ON,eri_seco/l3tol2percent=130,eri_trans
co/sdpOfferAnswer=Offer,ipdc/realm="Core1",ds/dscp=1D,gm/rsb=on,tman/pol=on,tman/sdr=4987,tman/mbs=4
987,gm/saf=on,gm/spf=on},L{
v=0
c=IN IP4 10.52.62.132
m=audio 12224 RTP/AVP $
b=AS:39
},R{
v=0
c=IN IP4 10.52.62.135
m=audio 9280 RTP/AVP 104 102 105 100 18 8 0
b=AS:39
a=rtpmap:104 AMR-WB/16000
a=fmtp:104 max-red=0; mode-change-capability=2; mode-set=0,1,2
a=rtpmap:102 AMR/8000
a=fmtp:102 max-red=0; mode-change-capability=2
a=rtpmap:105 telephone-event/16000
a=fmtp:105 0-15
a=rtpmap:100 telephone-event/8000
a=fmtp:100 0-15
```

```
a=maxptime:40
a=ptime:20
a=rtpmap:18 G729/8000
a=fmtp:18 annexb=yes
a=rtpmap:8 PCMA/8000
a=rtpmap:0 PCMU/8000
}}},E=1{g/cause,hangterm/thb{timerx=3600}}},MF=ip/252/1/3800{M{ST=1{O{MO=IN,RV=ON,eri_seco/l3tol2percen
t=130,eri_transco/sdpOfferAnswer=Answer,ipdc/realm="Access1",ds/dscp=1D,gm/rsb=on,tman/pol=on,tman/sdr
=4987,tman/mbs=4987,gm/saf=on,gm/spf=onbL{
v=0
c=IN IP4 10.52.62.148
m=audio 9536 RTP/AVP 104 102 105 100 18 8 0
b=AS:39
a=rtpmap:104 AMR-WB/16000
a=fmtp:104 max-red=0; mode-change-capability=2; mode-set=0,1,2
a=rtpmap:102 AMR/8000
a=fmtp:102 max-red=0; mode-change-capability=2
a=rtpmap:105 telephone-event/16000
a=fmtp:105 0-15
a=rtpmap:100 telephone-event/8000
a=fmtp:100 0-15
a=maxptime:40
a=ptime:20
a=rtpmap:18 G729/8000
a=fmtp:18 annexb=yes
a=rtpmap:8 PCMA/8000
a=rtpmap:0 PCMU/8000
},R{
v=0
c=IN IP4 10.52.40.205
m=audio 6482 RTP/AVP 104 105
b=AS:39
a=rtpmap:104 AMR-WB/16000
a=fmtp:104 mode-set=0,1,2;mode-change-capability=2;max-red=0
a=rtpmap:105 telephone-event/16000
a=fmtp:105 0-15
a=ptime:20
a=maxptime:40
}}},E=1{g/cause,hangterm/thb{timerx=3605}}}}}
    MOD REPLY 1
!/3 mg1/1 @10.52.62.213 P=34081113{C=3001900{MF=ip/252/1/3799{M{ST=1{L{
v=0
c=IN IP4 10.52.62.132
m=audio 12224 RTP/AVP 104 105
b=AS:39
a=rtpmap:104 AMR-WB/16000
a=fmtp:104 max-red=0; mode-change-capability=2; mode-set=0,1,2
a=rtpmap:105 telephone-event/16000
a=fmtp:105 0-15
a=ptime:20
a=maxptime:40
}}}},MF=ip/252/1/3800{M{ST=1{L{
v=0
c=IN IP4 10.52.62.148
m=audio 9536 RTP/AVP 104 105
b=AS:39
a=rtpmap:104 AMR-WB/16000
a=fmtp:104 max-red=0; mode-change-capability=2; mode-set=0,1,2
a=rtpmap:105 telephone-event/16000
a=fmtp:105 0-15
a=ptime:20
a=maxptime:40
}}}}}}
    MOD REQ 2
!/3 [10.52.62.84]:2944
T=34081116{C=3001900{PR=9,MF=ip/252/1/3799{M{ST=1{O{MO=IN,RV=ON,eri_seco/l3tol2percent=130,eri_trans
co/localSdpQuery=ON,eri_transco/sdpOfferAnswer=Offer,ipdc/realm="Core1",ds/dscp=1D,gm/rsb=on,tman/pol=o
n,tman/sdr=4987,tman/mbs=4987,gm/saf=on,gm/spf=on}L{
v=0
c=IN IP4 10.52.62.132
m=audio 12224 RTP/AVP $
b=AS:39
a=ptime:$
a=maxptime:$
},R{
v=0
c=IN IP4 10.52.62.135
m=audio 9280 RTP/AVP 104 105
b=AS:39
```

```
a=rtpmap:104 AMR-WB/16000
a=fmtp:104 max-red=0; mode-change-capability=2; mode-set=0,1,2
a=rtpmap:105 telephone-event/16000
a=fmtp:105 0-15
a=ptime:20
a=maxptime:40
}}},E=1{g/cause,hangterm/thb{timerx=3600}}},MF=ip/252/1/3800{M{ST=1{O{MO=IN,RV=ON,eri_seco/l3tol2percen
t=130,eri_transco/localSdpQuery=ON,eri_transco/sdpOfferAnswer=Answer,ipdc/realm="Access1",ds/dscp=1D,gm
/rsb=on,tman/pol=on,tman/sdr=16800,tman/mbs=16800,gm/saf=on,gm/spf=on},L{
v=0
c=IN IP4 10.52.62.148
m=audio 9536 RTP/AVP 110 111 18 8 0 112
b=AS:134
a=rtpmap:110 AMR/8000
a=fmtp:110 $
a=rtpmap:111 AMR/8000
a=fmtp:111 $
a=rtpmap:18 G729/8000
a=rtpmap:8 PCMA/8000
a=rtpmap:0 PCMU/8000
a=rtpmap:112 telephone-event/8000
a=ptime:$
a=maxptime:$
}}},E=1{g/cause,hangterm/thb{timerx=3605}}}}}
    MOD REPLY 2
!/3 mg1/1 @10.52.62.213 P=34081116{C=3001900{MF=ip/252/1/3799{M{ST=1{L{
v=0
c=IN IP4 10.52.62.132
m=audio 12224 RTP/AVP 104 105
b=AS:39
a=rtpmap:104 AMR-WB/16000
a=fmtp:104 max-red=0; mode-change-capability=2; mode-set=0,1,2
a=rtpmap:105 telephone-event/16000
a=fmtp:105 0-15
a=ptime:20
a=maxptime:40
a=codec-changed:0
}}}},MF=ip/252/1/3800{M{ST=1{L{
v=0
c=IN IP4 10.52.62.148
m=audio 9536 RTP/AVP 104 105
b=AS:39
a=rtpmap:104 AMR-WB/16000
a=fmtp:104 max-red=0; mode-change-capability=2; mode-set=0,1,2
a=rtpmap:105 telephone-event/16000
a=fmtp:105 0-15
a=ptime:20
a=maxptime:40
}}}}}}
    Control Plane Descriptor
!/3 1 @1.2.3.4
T=1{C=3001900{MF=ip/252/1/3799{M{ST=1{O{MO=IN,RV=ON,RG=OFF,eri_transco/sdpOfferAnswer=Offer,eri_tran
sco/localSdpQuery=ON,ds/dscp=1D,gm/rsb=on,gm/saf=on,gm/spf=on,tman/pol=on,tman/sdr=4987,tman/mbs=49
87,ipdc/realm="Core1"},L{
v=0
c=IN IP4 10.52.62.132
m=audio 12224 RTP/AVP 104 105
b=AS:39
a=ptime:20
a=maxptime:40
},R{
v=0
c=IN IP4 10.52.62.135
m=audio 9280 RTP/AVP 104 105
b=AS:39
a=rtpmap:104 AMR-WB/16000
a=fmtp:104 max-red=0; mode-change-capability=2; mode-set=0,1,2
a=rtpmap:105 telephone-event/16000
a=fmtp:105 0-15
a=ptime:20
a=maxptime:40
}}},E=1{g/cause,hangterm/thb{timerx=3600}}},MF=ip/252/1/3800{M{ST=1{O{MO=IN,RV=ON,RG=OFF,eri-
_transco/s
dpOfferAnswer=Answer,eri_transco/localSdpQuery=ON,ds/dscp=1D,gm/rsb=on,gm/saf=on,gm/spf=on,tman/pol=
on,tman/sdr=16800,tman/mbs=16800,ipdc/realm="Access1"},L{
v=0
c=IN IP4 10.52.62.148
m=audio 9536 RTP/AVP 104 105
b=AS:39
a=rtpmap:104 AMR-WB/16000
```

```
a=fmtp:104 max-red=0; mode-change-capability=2; mode-set=0,1,2
a=rtpmap:105 telephone-event/16000
a=fmtp:105 0-15
a=ptime:20
a=maxptime:40
},R{
v=0
c=IN IP4 10.52.40.205
m=audio 6482 RTP/AVP 104 105
b=AS:39
a=rtpmap:104 AMR-WB/16000
a=fmtp:104 mode-set=0,1,2;mode-change-capability=2;max-red=0
a=rtpmap:105 telephone-event/16000
a=fmtp:105 0-15
a=ptime:20
a=maxptime:40
}}},E=1{g/cause,hangterm/thb{timerx=3605}}}}}
```

Example B below illustrates an example request/response message flow and corresponding media plane descriptor representing the state of the media plane layer.

Example B

```
    RESERVE IP REQ
MspMseRi_ReserveIpReq:
networkId 2
ctrlDeviceId 7
createData MseRi_IpDeviceCreateReqD:
validityIndicator 0xc018ff
validAttributes:
{
networkId 2
remoteIpAddr {version MSE_RI_IPv4, address 10.52.62.135}
remotePort 9280
localPort 0
medialpInterfaceId 3
rtcpRemotePort 9282
rtcpRemoteIpAddr {version MSE_RI_IPv4, address 10.52.62.135}
nextHopId 3
streamMode 0
rtcpMode 0
mediaStopSupervisionDirection 0
mediaStopSupervisionTime 0
icmpDeliveryProblemNotify 0
icmpDeliveryProblemUdpTimer 6000
}
    RESERVE IP CFM
MspMseRi_ReserveIpCfm:
networkId 2
ctrlDeviceId 7
userPlaneDeviceId 8
localPort 12224
internalIpAddr {version MSE_RI_IPv4, address 10.52.62.132}
internalPort 1000
cpuLoad 0
vSwitchLoad 0
    MODIFY IP REQ
MspMseRi_ModifyIpReq:
networkId 2
ctrlDeviceId 7
userPlaneDeviceId 8
createData MseRi_IpDeviceCreateReqD:
validityIndicator 0x4018ff
validAttributes:
{
networkId 2
remoteIpAddr {version MSE_RI_IPv4, address 10.52.40.205}
remotePort 6482
localPort 0
medialpInterfaceId 3
rtcpRemotePort 6484
rtcpRemoteIpAddr {version MSE_RI_IPv4, address 10.52.40.205}
nextHopId 3
streamMode 3
rtcpMode 0
mediaStopSupervisionDirection 0
mediaStopSupervisionTime 0
icmpDeliveryProblemNotify 0
icmpDeliveryProblemUdpTimer 6000
}
    MODIFY IP CFM
MspMseRi_ModifyIpCfm:
networkId 2
ctrlDeviceId 7
userPlaneDeviceId 8
localPort 9536
cpuLoad 0
vSwitchLoad 0
numLostRtpPackets 0
numReceivedRtpPackets 0
    Media Plane Descriptor
endpoint #1
createData MseRi_IpDeviceCreateReqD:
validityIndicator 0xc018ff
validAttributes:
{
networkId 2
remoteIpAddr {version MSE_RI_IPv4, address 10.52.62.135}
remotePort 9280
localPort 12224
medialpInterfaceId 3
rtcpRemotePort 9282
rtcpRemoteIpAddr {version MSE_RI_IPv4, address 10.52.62.135}
nextHopId 3
streamMode 3
rtcpMode 0
mediaStopSupervisionDirection 0
mediaStopSupervisionTime 0
icmpDeliveryProblemNotify 0
icmpDeliveryProblemUdpTimer 6000
}
endpoint #2
createData MseRi_IpDeviceCreateReqD:
validityIndicator 0x4018ff
validAttributes:
{
networkId 2
remoteIpAddr {version MSE_RI_IPv4, address 10.52.40.205}
remotePort 6482
localPort 9536
medialpInterfaceId 3
rtcpRemotePort 6484
rtcpRemoteIpAddr {version MSE_RI_IPv4, address 10.52.40.205}
nextHopId 3
streamMode 3
```

-continued

```
rtcpMode 0
mediaStopSupervisionDirection 0
mediaStopSupervisionTime 0
icmpDeliveryProblemNotify 0
icmpDeliveryProblemUdpTimer 6000
}
```

State Restoration

Two methods of restoring user sessions are contemplated. In a first approach, referred to as the single-layer method, the descriptors stored in the external database are used to generate a set of message that can be replayed to the highest service layer to restore the session. In a second approach, referred to as the multi-layer method, the separate descriptors stored in the external database 60 are used to independently restore the state of each layer.

Figure 5:
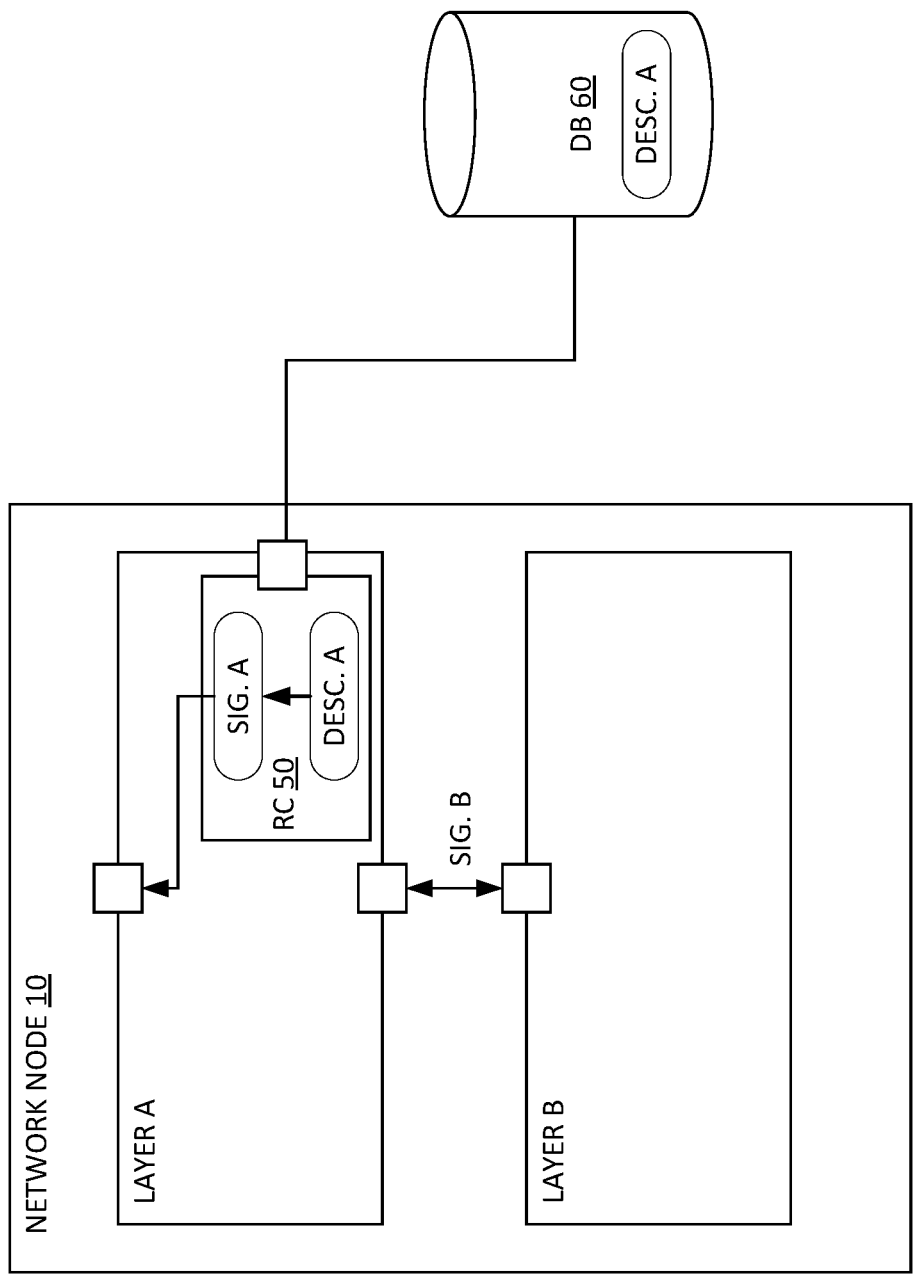
FIG. 5 illustrates the logical elements of a network node involved in restoring user sessions according to a first approach.

An example of the single-layer method for session restoration is shown in FIG. 5. This method is similar to the log-based rollback recovery without the need to record the entire history of messages. Instead, only a compact descriptor is stored that is then used to recreate the minimum set of messages needed to rebuild the states of a layer when a session restoration trigger of failure notification is received by the RC 50. The details of the failure notification are outside of the scope of this disclosure. In response to the failure notification, the RC 50 fetches the corresponding session descriptor from the external database 60 and constructs a layer-specific message that can be processed as a regular input to a layer. As shown in FIG. 5, the RC 50 for Layer A fetches the descriptor for Layer A, denoted DescA, and generates a message or set of messages, denoted Sig. A, that is input to Layer A. In this case, Layer A process the message or messages from the RC 50 as regular input and generates one or more internal messages to Layer B, denoted Sig. B. This process is repeated for each user session.

The single-layer approach is useful where there is no strict requirement on the speed of restoration. In this approach, only a single RC 50 at the highest layer of hierarchy (e.g., control plane) is needed. States of the lower layers will be recreated as a propagation of normal signaling. From the perspective of Layer B there is no difference between state creation and re-creation. This solution brings minimum complexity to the system, at the price of a slower restoration time that is caused by the sequential state propagation between the hierarchy of layers.

There can be cases when the final state of a layer's state machine cannot be reached by playing a single message. In such cases, the task of the RC 50 is extended by creating dummy signals to help reach the desired final state. For optimal performance, the set of restoration messages should comprise the minimum number of messages need to restore the active session.

Figure 6:
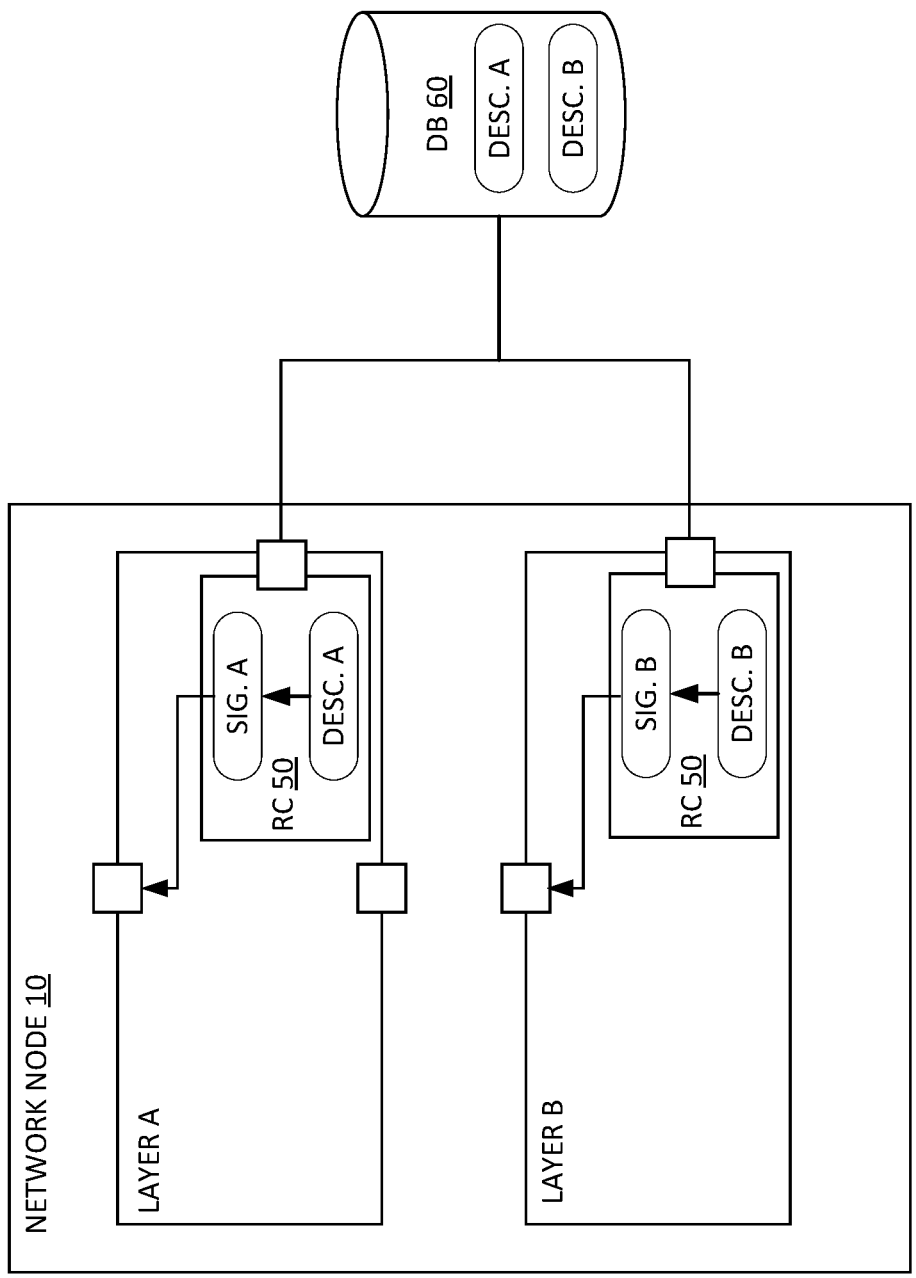
FIG. 6 illustrates the logical elements of a network node involved in restoring user sessions according to a second approach.

An example of the multi-layer method is shown in FIG. 6. This method is useful for the most time sensitive applications, when there is an imperative to restore the service as fast as possible so that there is minimal disruption in the user experience. In this example, it is assumed that Layer A comprises a control plane layer and Layer B comprises a media plane player. Thus, the service requested by the user is controlled by Layer A and the actual traffic is controlled by Layer B. In case of type F1 or F2 failure, the states of a user session disappear from the network node 10 and the service gets disrupted. Separate descriptors are stored in the external database 60 for Layer A and Layer B. To minimize the disruption of the service and ensure high availability to the end users, a 2-step recovery process is used. Additional steps can be added depending on the number of layers. To restore the traffic flow as fast as possible, the state of Layer B is restored first using the corresponding descriptor stored in the external database. More particularly, the state of Layer B is restored by generating and replaying one or more messages to Layer B to recreate the state. In this case, the creation of states shall not trigger normal message exchange between layers (which is indicted by the missing signal between Layer A and B), as it could overwrite existing states created by the local RC 50.

The state of Layer A is restored in a similar fashion using the corresponding descriptor stored in the external database. In some embodiments, the state of Layer A is restored after Layer B has been restored. In other embodiments, the states of Layer A and Layer B may be restored in parallel. Parallel restoration is useful where the layers do not share the same resources (e.g., running on different cores).

After the states of Layer A and Layer B are restored, a procedure may be performed to verify the restored state of the one or more service layers. In some embodiments, an audit procedure is performed to ensure consistency between the restored states. As an example, the RC 50 can verify that the same amount of request and confirm signals would have been generated by the neighboring layers. If there is a mismatch, the layer where state creation was not successful can notify its neighbors by sending reject signals for the states that were not built up. In other embodiments, RC 50 compares the recovered states to corresponding entries in the external database 70.

In some embodiments, the service provider can restore the active sessions for a plurality of different users in order of priority. For example, the service provider in one embodiment offers privileged services to a group of subscribers (e.g., guaranteed bandwidth). In case of a failure, the sessions for the members of the privileged group are restored first. The RC 50 or other ancillary function keeps track the sessions for members of the group. When a failure of the network node 10 occurs, the sessions of the group members can be restored before the sessions of non-members.

Although the disclosure discusses only two layers, the techniques herein described can be easily extended to any number of layers.

To facilitate a more concrete understanding, an example application of the fast session restoration technique for a virtual BGF (vBGF) is now described. The vBGF is responsible for filtering the media traffic between the access and core networks. As a firewall, it allows or denies different flows to enter or exit the operator's network. To grant access for a specific user, a controller node, called vSBG, gives instructions through H.248 messages. Whenever the proper settings are applied (e.g., flow rules are installed, transcoding resources are reserved), the subscribers can start to speak with each other using the operators network.

The functionality is provisioned by three main software components: 1) an application to terminate H.248 signaling (i.e., control plane); 2) an IP pipeline to handle media plane traffic (i.e., media plane); and 3) media transcoding to be able to transcode between different audio codecs implemented as part of the media plane. The external communication towards the control plane uses H.248 signaling, while within the software components internal signaling is used.

The vBGF network functionality is a cluster of VMs in the cloud. If a process in vBGF fails (failure type F1) or if the VM itself becomes unavailable (failure type F2), all the ongoing sessions will be lost on that specific instance. To provide N+1 redundancy for the vBGF, a distributed database 60 with ultra-low latency is used to store descriptors for each service layer of the vBGF. The distributed database 60 provides protection against F3 type failures. The state of user sessions is recorded for each layer as descriptors. In the event of a type F1 or type F2 failure, the affected sessions are restored using the descriptors for each layer using the layered restoration approach described above.

Figure 7:
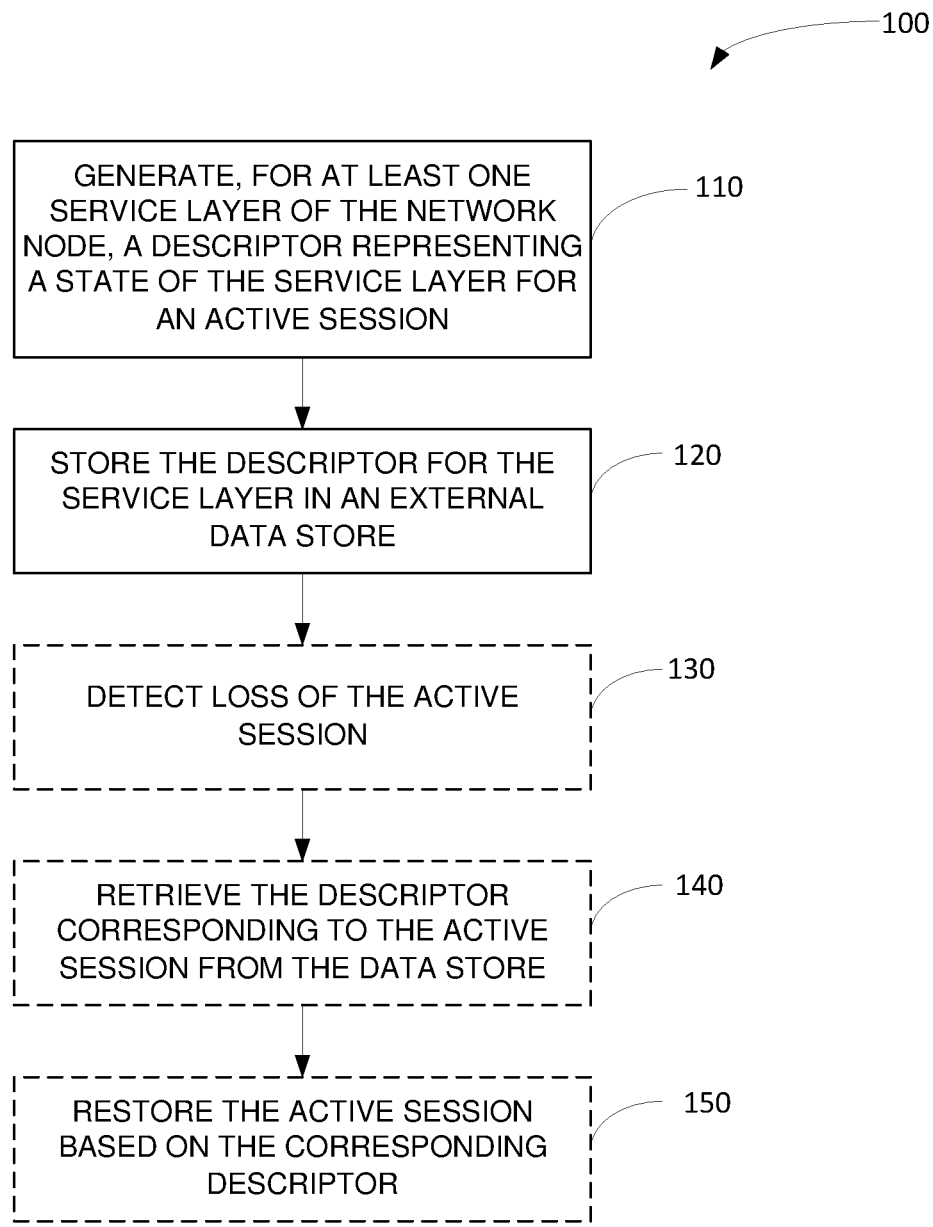
FIG. 7 illustrates a method implemented by a redundancy controller of restoring one or more user sessions after failure of a network node.
Figure 8A:
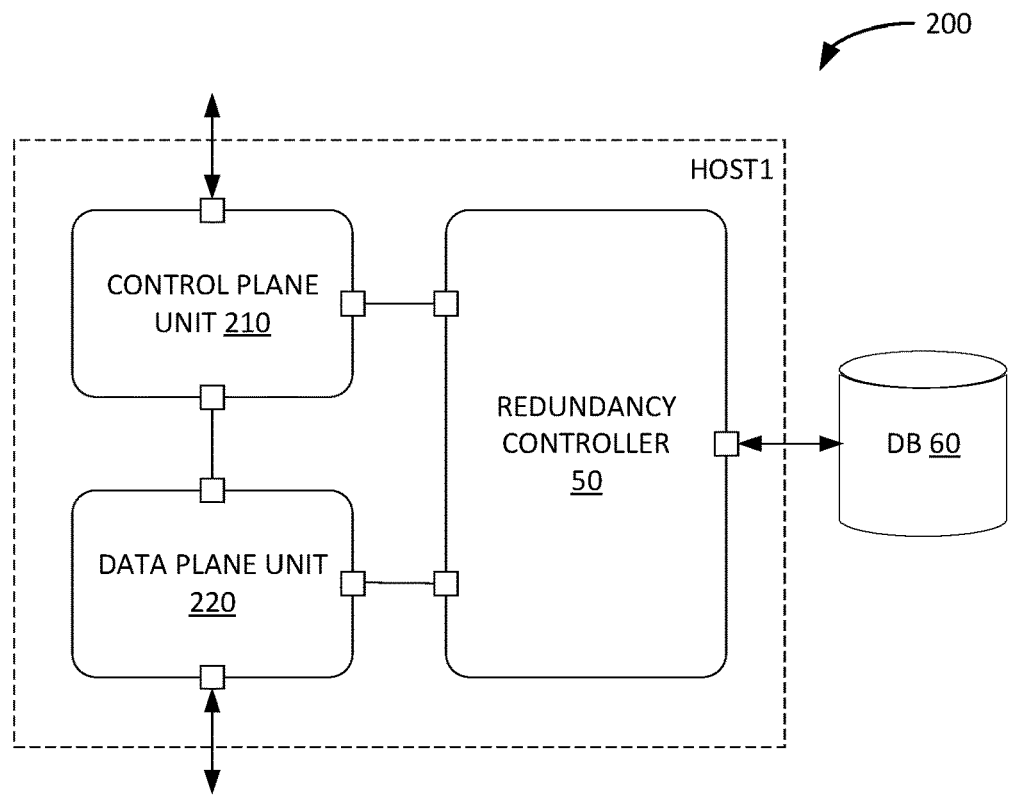
FIGS. 8A-8D illustrate exemplary implementations of the network node.
Figure 8B:
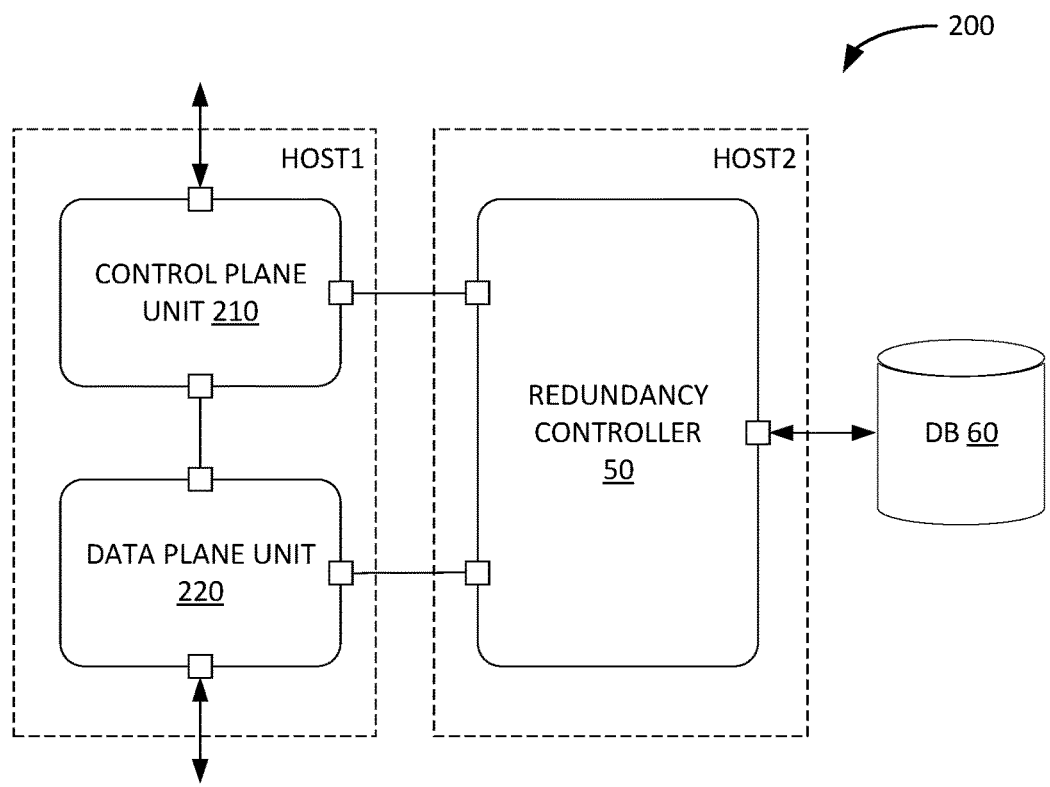
Figure 8C:
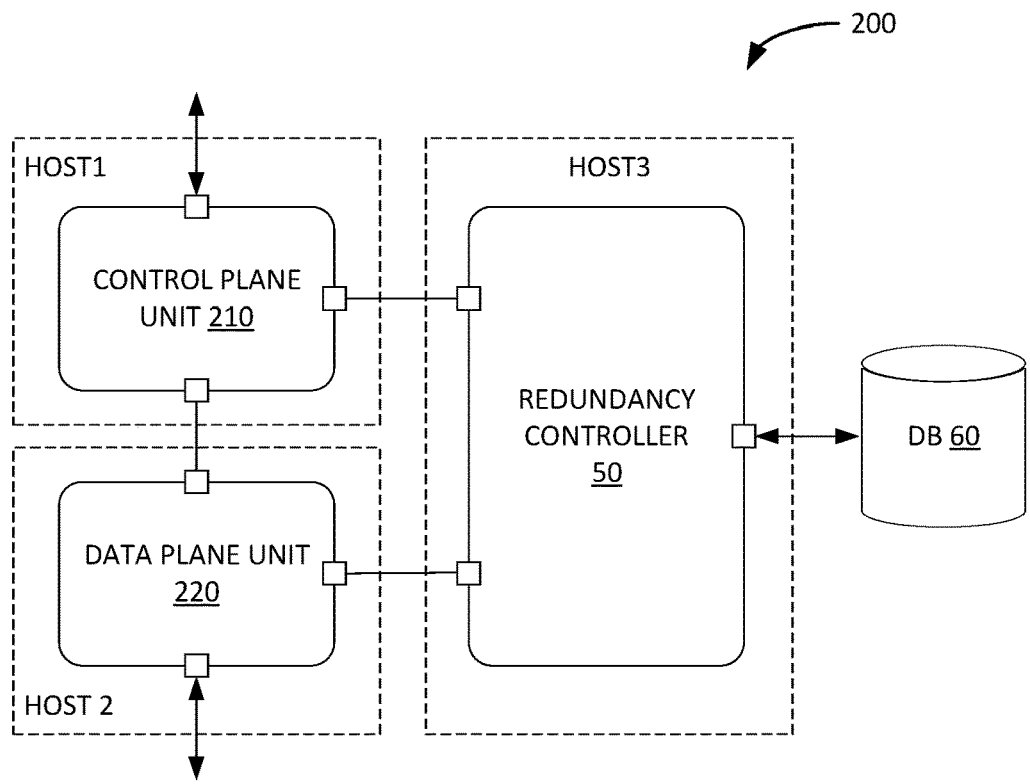
Figure 8D:
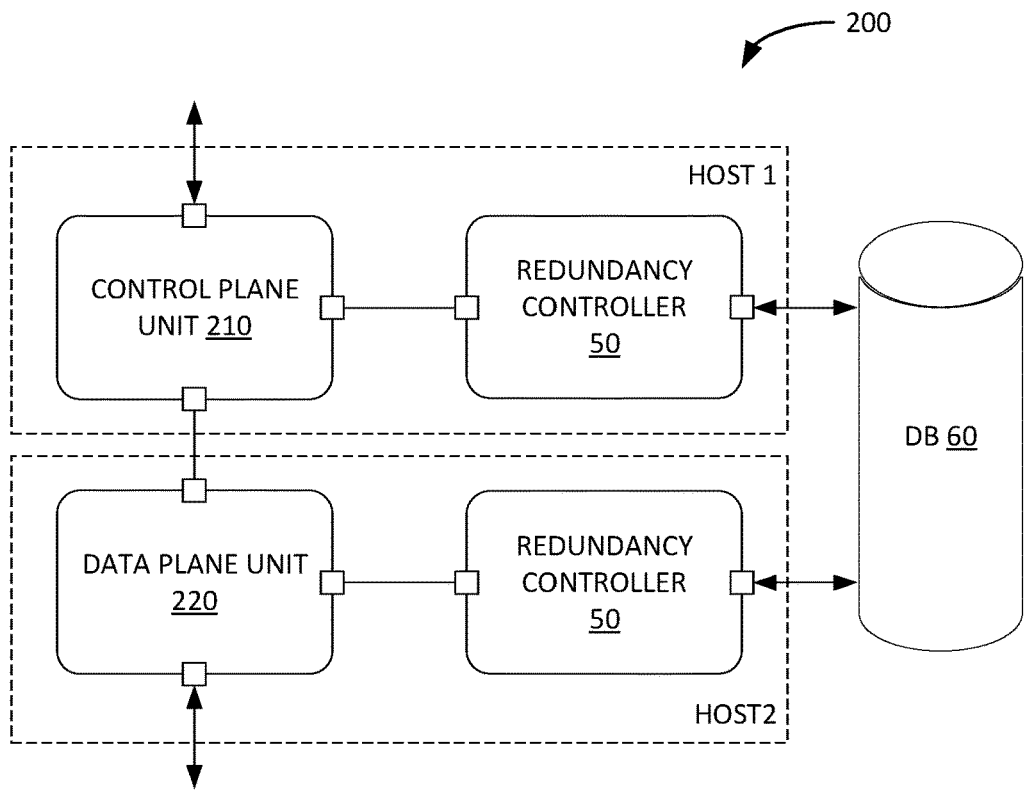

FIG. 7 illustrates an exemplary method 100 implemented by a RC 50. The RC 50 generates, for at least one service layer of a network node 10, a descriptor representing a state of the service layer for an active session (block 110). The RC 50 stores the descriptor for the service layer in an external database 60. The descriptor stored in the external database 60 can be subsequently used to enable fast restoration of a user session (block 120).

In some embodiments of the method 100, the RC 50 detects loss of an active session (block 130). Detecting loss of the active session may comprise detecting restart or termination of the service layer, or detecting loss of the active session comprises detecting restart or termination of the network node 10. Loss of an active session may also be indicated by a restoration trigger or failure notification received by the network node 10.

Responsive to detecting loss of the active session, the RC 50 retrieves the descriptor corresponding to the active session from the database 60 (block 140) and restores the active session based on the corresponding descriptor (block 150). In one example, the active session is restored by generating a minimal set of restoration messages from the descriptor, and playing the minimal set of restoration messages to the corresponding service layer to restore the state of the service layer. In one embodiment, the minimal set of restoration messages is played to a first service layer to restore the state of the first service layer, and changes in the state of the first service layer are propagated to a second service layer below the first service layer to restore a state of the second service layer. In other embodiments, the states of the service layers are restored independently.

In some embodiments of the method 100, restoring the active session based on the corresponding descriptor comprises restoring one or more context variables for the active session used by the service layer to values stored by the descriptor.

In some embodiments of the method 100, generating a descriptor representing the state of at least one service layer the network node for an active session is performed responsive to determining that the state of the active session is complete. For example, the RC 50 may detect a confirm message, and determine that the state of an active session is complete based on the confirm message.

Some embodiments of the method 100 further comprise updating the descriptor for the active session responsive to detecting a change in the state of the active session. In one example, updating the descriptor for an active session comprises maintaining a local copy of the descriptor in a local memory and a record copy of the descriptor in the external database 60, modifying the local copy of the descriptor responsive to detecting a change in the state of the active session, and replacing the record copy of the descriptor with the local copy of the descriptor responsive to determining that a changed state of the active session stored in the local copy of the descriptor is complete. In another example, updating the descriptors for an active session comprises retrieving the descriptor responsive to determining that a changed state of the active session is complete, modifying the descriptor; and storing the modified descriptor in the external database 60.

Some embodiments of the method 100 further comprise generating, for each of two or more service layers of the network node, a descriptor representing the state of the service layer for an active session, and storing the descriptors in an external database 60. In one example, the two or more service layers comprise a control plane layer and a data plane layer. In the event that an active session is lost, each service layer is restored based on a corresponding descriptor in the external database 60.

Some embodiments of the method 100 further comprise restoring the states of the control plane layer and data plane layer in a prioritized order. In one embodiment, the data plane layer is restored before the state of the control plane layer. In another embodiment, the RC 50 independently restores the states of the control plane layer and data plane layer respectively.

In some embodiments of the method 100, generating and storing a descriptor is performed for a plurality of active sessions. Upon detecting loss of two or more active sessions, the active sessions are restored in a prioritized order based on the corresponding descriptors stored in the external database 60.

Some embodiments of the method 100 further comprise verifying a restored state of the one or more service layers. In one embodiment, verifying a restored state of the one or more service layers may comprise performing an audit of the states of two or more service layers to verify consistency between the states of the two or more service layers. In another embodiment, verifying a restored state of the one or more service layers comprises comparing recovered states to corresponding entries in the external data base.

FIGS. 8A-8D illustrate exemplary implementations of a network node 200 including a RC 50. In each of these embodiments, the network node 200 comprises a control plane unit 210 configured to implement the control plane functions, a data plane unit 220 configured to implement the media plane functions, and a RC 50 configured to function as herein described. In the embodiment shown in FIG. 8A, the control plane unit 210, data plane unit 220, and RC 50 are implemented on the same physical resources or the same VM, denoted as Host1. In the embodiment shown in FIG. 8B, the control plane unit 210 and data plane unit 220 are implemented on first physical resources or a first VM, denoted as Host1, and the RC 50 is implemented on second physical resources or a second VM denoted as Host2. In the embodiment shown in FIG. 8C, the control plane unit 210 is implemented on first physical resources or a first VM denoted as Host1, the data plane unit 220 is implemented by second physical resources or a second VM denoted as Host2, and the RC 50 is implemented by third physical resources or third VM denoted as Host3. Finally, in the embodiment shown in FIG. 8D, the control plane unit 210 is implemented by first physical resources or a first VM and the data plane unit 220 is implemented by a second physical resources or a second VM denoted as Host2. The functionality of the RC 50 is distributed between Host1 and Host2.

Figure 9:
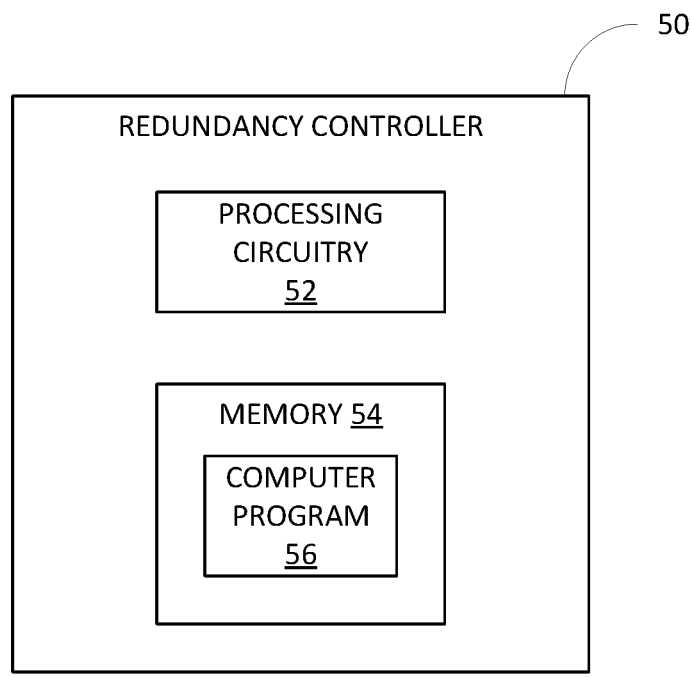
FIG. 9 illustrates the main functional elements of a redundancy controller.

FIG. 9 illustrates an exemplary RC 50. Generally, the RC 50 comprises processing circuitry 52 and memory 54 storing one or more computer programs 86 and data needed for operation. The processing circuitry 52 comprises one or more processors, hardware, firmware, or a combination thereof. Memory 54 comprises any tangible, non-transitory computer-readable storage medium for storing data including electronic, magnetic, optical, electromagnetic, or semiconductor data storage. Memory 54 stores a computer program 56 comprising executable instructions that configure the processing circuit 52 to implement the methods as herein described, including the method of FIG. 7. The computer programs 56 comprise executable program instructions that when executed by the processing circuitry cause the RC 50 to perform the methods as herein described. In one embodiment, execution of the instructions causes the RC 50 to generate, for at least one service layer of the network node, a descriptor representing a state of the service layer for an active session, and to store the descriptor for the service layer in an external database 60.

Those skilled in the art will also appreciate that embodiments herein further include corresponding computer programs 56. A computer program 56 comprises instructions which, when executed on at least one processor of an apparatus, cause the apparatus to carry out any of the respective processing described above. A computer program 56 in this regard may comprise one or more code modules corresponding to the means or units described above.

Embodiments further include a carrier containing such a computer program 56. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

The methods and apparatus herein described enable fast session restoration for network nodes suitable for latency sensitive applications. The fast session restoration techniques take advantage of the layered architecture of a network node and stores layer-specific descriptors that describe the states of corresponding service layers of a network node for an active session. When a failure of the network nodes occurs, the descriptors are used to achieve a seamless and fast session restoration.

The above description of illustrated implementations is not intended to be exhaustive or to limit the scope of the disclosure to the precise forms disclosed. While specific implementations and examples are described herein for illustrative purposes, various equivalent modifications are possible within the scope of the present disclosure, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs.

What is claimed is:

1. A method implemented by a redundancy controller for providing protection for a session managed by a network node in a telecommunications network, the network node implemented by a hierarchy of service layers including a media plane layer and a control plane layer that manages media sessions, the method comprising:
generating, a layer-specific descriptor for at least the control plane layer, each layer-specific descriptor representing a state of a respective service layer for an active session;
storing the layer-specific descriptor for at least the control plane layer in an external database; and
restoring, responsive to a loss of the active session, the states of the control plane layer and media plane layer for the lost session based on the stored layer-specific descriptors.

2. The method of claim 1, wherein the generating is performed responsive to determining that the state of the active session is complete.

3. The method of claim 1, further comprising:
detecting a confirm message; and
determining that the state of an active session is complete based on the confirm message.

4. The method of claim 1, further comprising updating one or more of the layer-specific descriptors for the active session responsive to a change in the state of the active session.

5. The method of claim 4, wherein the updating one or more of the layer-specific descriptors for the active session comprises:
maintaining a local copy of the layer-specific descriptors in a local memory and a record copy of the layer-specific descriptors in the external database;
modifying the local copy of at least one of the layer-specific descriptors responsive to a change in the state of the active session; and
replacing one or more of the layer-specific descriptors with the local copy of the one or more modified layer-specific descriptors responsive to determining that a changed state of the active session stored in the local copy of the one or more modified layer-specific descriptors is complete.

6. The method of claim 4, wherein the updating the one or more of the layer-specific descriptors for an active session comprises:
retrieving the one or more of the layer-specific descriptors responsive to determining that a changed state of the active session is complete;
modifying the one or more of the layer-specific descriptors; and
storing the modified layer-specific descriptors in the external database.

7. The method of claim 1, further comprising:
retrieving the layer-specific descriptors corresponding to the active session from the database responsive to a loss of the active session; and
restoring the active session based on the corresponding layer-specific descriptors.

8. The method of claim 7, wherein the restoring the active session based on the corresponding layer-specific descriptors comprises:
generating a minimal set of restoration messages from at least one of the layer-specific descriptors; and
playing the minimal set of restoration messages to the corresponding service layer to restore the state of the service layer.

9. The method of claim 8, wherein the restoring the active session based on the corresponding layer-specific descriptors further comprises:
playing the minimal set of restoration messages to the control plane layer to restore the state of the control plane layer; and
propagating changes in the state of the control plane layer to media plane layer to restore a state of the media plane service layer.

10. The method of claim 7, wherein restoring the active session based on the corresponding layer-specific descriptors comprises restoring one or more context variables for the active session used by the service layer to values stored by descriptor.

11. The method of claim 1, wherein the method comprises:
generating, for each of two or more service layers of the network node, a descriptor representing the state of the service layer for an active session; and
storing the descriptors in an external database.

12. The method of claim 11, wherein restoring the active session based on the corresponding layer-specific descriptors comprises restoring each service layer independently based on a corresponding descriptor in the external database responsive to loss of the active session.

13. The method of claim 1, wherein generating and storing the layer-specific descriptors is performed for a plurality of active sessions.

14. The method of claim 1, further comprising verifying a restored state of the one or more service layers.

15. A redundancy controller for a network node, the redundancy controller comprising:
processing circuitry;
memory containing instructions executable by the processing circuitry whereby the redundancy controller is operative to:
generate, a layer-specific descriptor for at least the control plane layer, each layer-specific descriptor representing a state of a respective service layer for an active session;
store the layer-specific descriptor for at least the control plane payer in an external database; and
restore, responsive to a loss of the active session, the states of the control plane layer and media plane layer for the lost session based on the one or more stored layer-specific descriptors.

16. The redundancy controller of claim 15, wherein the instructions are such that the redundancy controller is operative to generate the layer-specific descriptors responsive to determining that the state of the active session is complete.

17. The redundancy controller of claim 15, wherein the instructions are such that the redundancy controller is operative to:
generate, for each of the media plane layer and the control plane layer of the network node, a layer-specific descriptor representing the state of the respective service layer for an active session; and
store the layer-specific descriptors in an external database.

18. A network node configured to:
processing circuitry;
memory containing instructions executable by the processing circuitry whereby the network node is operative to:
generate, a layer-specific descriptor for at least the control plane layer, each layer-specific descriptor representing a state of a respective service layer for an active session;
store the layer-specific descriptor for at least the control plane layer in an external database; and
restore, responsive to a loss of the active session, the states of the control plane layer and media plane layer for the lost session based on the one or more stored layer-specific descriptors.

* * * * *